March 4, 1958 W. H. REBENSDORF 2,825,606
TIMBER COUPLING AND TRESTLE-ERECTING BRACKET
Filed March 18, 1957

William H. Rebensdorf
INVENTOR.

United States Patent Office 2,825,606
Patented Mar. 4, 1958

2,825,606

TIMBER COUPLING AND TRESTLE-ERECTING BRACKET

William H. Rebensdorf, Kimball, S. Dak.

Application March 18, 1957, Serial No. 646,598

5 Claims. (Cl. 304—5)

The present invention relates, somewhat generally stated, to structural means, coupling brackets and equivalent devices, for example, whereby readily available horizontal and vertical timbers may be assembled and reliably connected together to provide a trestle.

Persons conversant with the art to which the invention relates are aware of the fact, as the preceding statement of the invention implies, that many and varied styles and forms of so-called coupling brackets have been offered with a view toward developing and extending this field of endeavor. For example, reference may be made to the Tolmie Patent 1,597,555 of August 24, 1926. Many analogous patents, not to be here cited, may be turned up as exemplary of the state of the art to which the invention relates.

It is also a matter of common knowledge that knockdown trestles such as the one herein revealed are extensively employed in erecting and building scaffolds, workbenches, platforms, carpenters' horses and the like. With these factors in mind, it will be evident, having examined the figures of the accompanying drawing, that the present development has to do with an improved bracket, one, which it is believed, will meet with the approval of manufacturers thereof and will certainly serve, in a more effectual manner, the needs of the users of such trestle-erecting brackets.

Briefly, the invention is characterized by vertically disposable open-ended metal or equivalent tubes. These constitute socket members for telescopic reception and retention of the upper end portions of the vertical or leg-forming timbers. The upper ends thereof are hingedly connected together by means interposed therebetween, which means embodies at least one horizontal tubular sleeve in which an end portion of a horizontal beam-forming timber is telescopically fitted, sheathed and temporarily nailed in place.

More specifically, the means connecting the upper ends of the socket members comprises a pair of spaced, parallel, hingedly connected sleeves, whereby to provide an arrangement wherein two horizontal timbers may be satisfactorily utilized for rigidity and stability.

Other objects, features and advantages will become more readily apparent from the following description and the accompanying illustrative, but not restrictive, drawing.

In the drawing, wherein like numerals are employed to designate like parts throughout the views.

Figures 1, 2, 3:
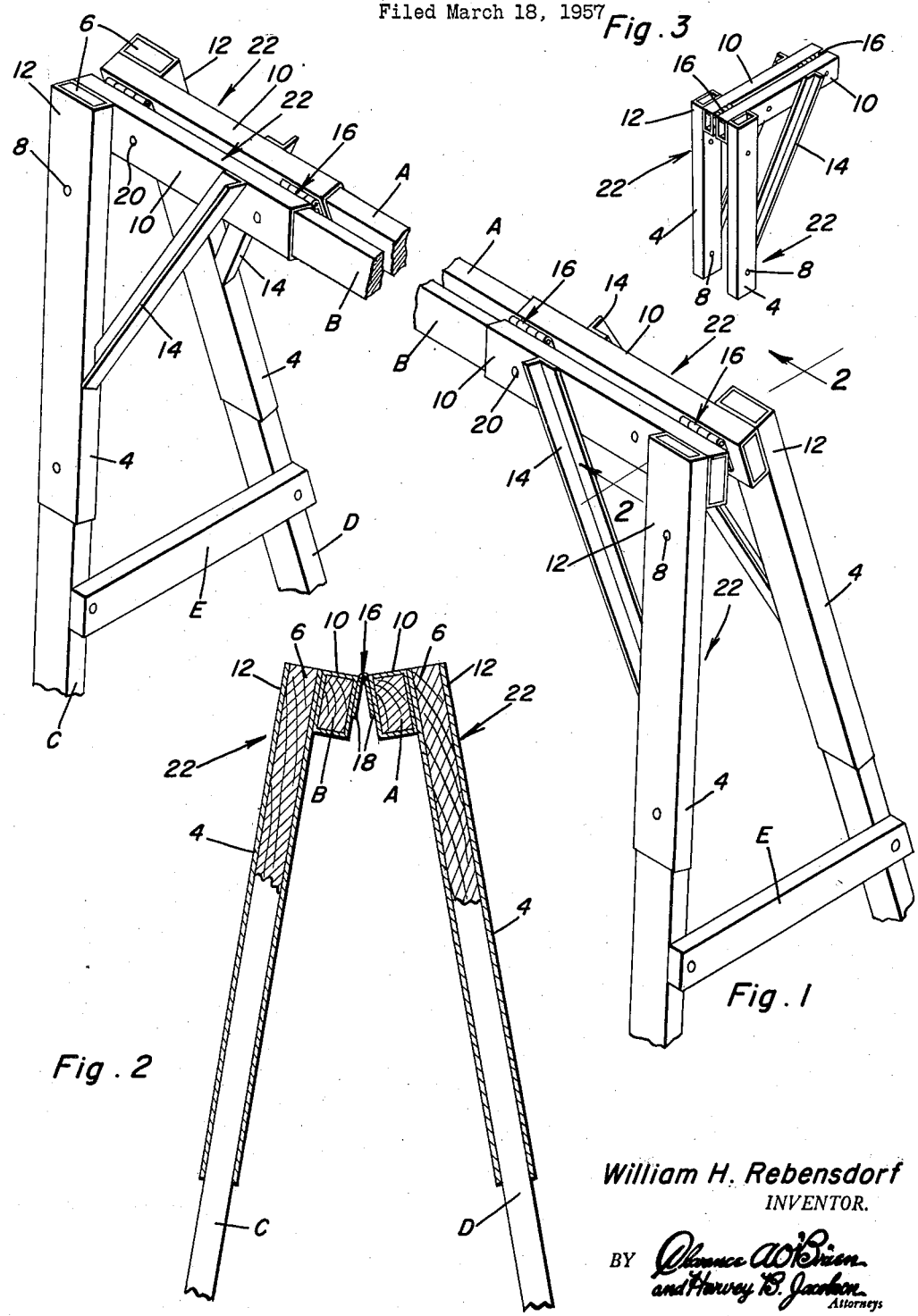
Fig. 1 is a perspective view in which the horizontal and vertical timbers are fragmentarily shown and are connected together by the improved brackets to erect or construct the aforementioned trestle.
Fig. 2 is a view on an enlarged scale with parts in section and elevation and taken on the plane of the line 2—2 of Fig. 1 looking in the direction of the arrows.
Fig. 3 is a perspective view, on a small scale, of one of the improved timber assembling and coupling brackets.

As seen in Fig. 1, the horizontal timbers, a pair being used, are denoted by the letters A and B, which together provide a plank or board supporting beam. The vertical leg-forming timbers are denoted by the letters C and D, these being held together by a suitably nailed crosspiece E.

The brackets whereby these timbers A, B, C and D may be assembled, coupled and rigidly, but temporarily secured together are used in pairs as illustrated and each bracket or device is the same in construction and a description of one will serve the purposes here. As before mentioned, the means to accommodate and assemble the leg-forming timbers comprises a pair of duplicate elongated metal or equivalent tubes 4, and these constitute the socket members. The upper and lower ends are open and the tubes are preferably rectangular in cross section. The upper end portions 6 of the timbers are telescopically fitted in place and sheathed and are temporarily fastened by nails driven through nailing holes 8. The means hingedly connecting the upper end portions of the socket members together is characterized by at least one sleeve, the socket members being hingedly connected thereto. By preference, however, two such sleeves 10, which are also open-ended metal tubes, are employed. In fact, the upper end of each socket member is superimposed against the outer vertical wall of the outer end portion of each sleeve in the manner shown and its upper end 12 is fixed in place, preferably with the upper open end flush with the top edge of the sleeve. Each sleeve and socket member is thus joined together in right angular relationship and is rigidly held in place by a diagonal angle-iron brace or an equivalent member 14. It follows that each sleeve and its accompanying socket member forms an L-shaped unit or component. In other words, the over-all "bracket" is made up of a pair of opposed L-shaped units. More particularly, the inner opposed vertical walls of the respective sleeves are connected together by leaf hinges which are denoted generally at 16, the leaves 18 being fastened in place with the parts appearing as perhaps best shown in Fig. 2. The side walls of the sleeves are also provided with nailing holes 20 to accommodate nails or equivalent fasteners whereby to permit the horizontal timbers to be telescoped and sheathed in the sleeves and temporarily fastened in place.

By employing a pair of brackets made up of the L-shaped, hingedly connected sections or units 22, a user thereof may readily position, assemble and couple together the horizontal and vertical timbers and thus provide a scaffold-erecting or an equivalent trestle. The hinged construction permits the leg-forming timbers to be spread apart to raise or lower the beam-forming timbers, after which the crosspieces E may be nailed in place.

By reason of the fact that the upper ends of the socket members 4 are opened, it is possible to extend the upper ends of the timbers C and D above the plane of horizontal timbers (not shown) to serve as stops or shoulders and to assist in retaining the endmost boards or planks (not shown) in scaffold-forming position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in assembling, erecting and temporarily coupling horizontal and vertical timbers such as are used, for example, in constructing a knockdown trestle: a bracket comprising a pair of spaced parallel open-ended sleeves adapted for telescoping reception and retention of the end portions of a pair of horizontal beam-forming timbers, means securing said sleeves to each other, and a pair of companion open-ended socket members opposed to each other and affixed at right angles to the outer end portions of their respective sleeves and likewise adapted for telescoping reception and retention of vertical leg-forming timbers.

2. The structure defined in claim 1 and wherein the upper end portions of said socket members are superimposed upon the outer vertical surfaces of said sleeves, said sleeves and socket members having timber nailing holes where needed.

3. The structure defined in claim 1 and wherein the upper end portions of said socket members are superimposed upon the outer vertical surfaces of said sleeves, said sleeves and socket members having timber nailing holes where needed, being rectangular in cross section and defining, conjointly, a pair of opposed L-shaped units, and a diagonal brace connecting the sleeve and socket member of each unit.

4. For use in assembling, erecting and temporarily coupling horizontal and vertical timbers such as are used, for example, in constructing a knockdown trestle; a bracket comprising a pair of spaced parallel open-ended sleeves adapted for telescoping reception and retention of the end portions of a pair of horizontal beam-forming timbers, means securing said sleeves to each other, and a pair of companion open-ended socket members opposed to each other and affixed at right angles to the outer end portions of their respective sleeves and likewise adapted for telescoping reception and retention of vertical leg-forming timbers, the means connecting said sleeves comprising leaf hinges, the leaves of which are interposed between and fastened to their respective sleeves.

5. A timber assembling and coupling bracket comprising at least one horizontal open-ended tube constituting a sleeve and serving to receive and temporarily retain an end portion of a timber therein, a pair of opposed socket members open at their upper and lower ends and adapted to receive and secure in place end portions of vertical timbers, the upper end of one socket member being fixed at right angles to an end portion of said sleeve, the upper end portion of the other socket member being hingedly attached to said socket member whereby the socket members may be spread apart or folded together.

References Cited in the file of this patent
UNITED STATES PATENTS

| | | |
|---|---|---|
| 1,597,555 | Tolmie | Aug. 24, 1926 |
| 1,656,558 | Dysinger | Jan. 17, 1928 |
| 2,501,656 | Anderson | Mar. 28, 1950 |